United States Patent [19]
Belt et al.

[11] Patent Number: 5,136,694
[45] Date of Patent: Aug. 4, 1992

[54] METHOD AND APPARATUS FACILITATING COMMUNICATION BETWEEN TWO KEYBOARDS AND A SINGLE PROCESSOR

[75] Inventors: Steven L. Belt, Stevensville; Mark A. Ruthenbeck; Mark J. Foster, both of Lincoln Township, Berrien County; Brian C. Barnes, Benton Township, Berrien County; Randy J. VanderHeyden, St. Joseph Township, Berrien County, all of Mich.

[73] Assignee: Zenith Data Systems Corporation, Buffalo Grove, Ill.

[21] Appl. No.: 334,841

[22] Filed: Apr. 7, 1989

[51] Int. Cl.⁵ .................................. G06F 15/02
[52] U.S. Cl. ....................... 395/275; 364/928; 364/928.4; 364/929.2; 364/264; 364/DIG. 1; 341/22
[58] Field of Search .............. 340/711; 341/22, 24; 364/709.01, 709.02, 709.05, 709.06, 709.08, 709.09, 709.1, 709.12, 200 MS File, 900 MS File

[56] References Cited
U.S. PATENT DOCUMENTS

| | | | |
|---|---|---|---|
| 4,064,560 | 12/1977 | Baxter | 364/900 |
| 4,156,928 | 5/1979 | Inose | 364/900 |
| 4,396,985 | 8/1983 | Ohara | 364/900 |
| 4,398,250 | 8/1983 | Hosono | 364/900 |
| 4,460,957 | 7/1984 | Eggebrecht | 364/900 |
| 4,642,761 | 2/1987 | Yanagiuchi | 364/200 |
| 4,727,478 | 2/1988 | Endfield | 364/200 |
| 4,816,996 | 3/1989 | Hill | 364/200 |
| 4,862,353 | 8/1989 | Williams | 364/708 |
| 4,965,560 | 10/1990 | Riley | 340/717 |

Primary Examiner—Thomas C. Lee
Assistant Examiner—Eric Coleman
Attorney, Agent, or Firm—Flynn, Thiel, Boutell & Tanis

[57] ABSTRACT

A computing device includes a system control processor, a built-in keyboard having a plurality of keys, a connector which facilitates connection of an external keyboard or keypad to the device, an electronic switch which is controlled by the internal keyboard processor and can electrically couple the connector to the system control processor. The internal keyboard processor monitors signals from the system control processor, connector and internal keyboard keys in order to open and close the analog switch so as to facilitate transfers between the system control processor and the internal keyboard through itself, and transfers between the system control processor and an external keyboard through the electronic switch.

23 Claims, 5 Drawing Sheets

METHOD AND APPARATUS FACILITATING COMMUNICATION BETWEEN TWO KEYBOARDS AND A SINGLE PROCESSOR

FIELD OF THE INVENTION

This invention relates to a keyboard arrangement for a computing device and, more particularly, to an arrangement in which an external key device can be coupled to a computing device having a built-in keyboard.

BACKGROUND OF THE INVENTION

Computing devices of the type commonly called personal computers have been available for over a decade, and typically include a central processing unit which has no alpha-numeric keys but which has a connector, and a keyboard which is physically separate from the central processing unit and which has a cable which can be coupled to the connector of the central processing unit in order to effect an electrical connection therebetween. The keyboard has a plurality of manually operable keys, typically including one set which is similar to a traditional typewriter keyboard, and a further set which controls cursor movement and special functions. This conventional keyboard is relatively lightweight, and many users like to place it in their laps during long computing sessions, while the heavy central processing unit rests on a table or the floor.

More recently, a portable variation of the personal computer has been rapidly gaining popularity and is the so-called "laptop" style, which is relatively compact and lightweight and which typically has a single housing which includes both the central processing unit and a built-in alpha-numeric keyboard. However, the keys for special functions and cursor control are typically not provided as a set of separate keys, but instead are assigned to keys which already serve as keys of the standard typewriter-type set of keys. In order to execute these special control functions, the user must usually use a special control key to tell the system whether the dual function keys are presently being used to control the special functions rather than for their normal purpose, which is relatively cumbersome and inefficient. Further, the weight of a laptop computer is sufficiently large that, despite the "laptop" nickname, it is usually uncomfortable to actually work with it in one's lap for more than a short period of time, and it also becomes uncomfortable if the laptop is placed during extended use on a table or other support surface which is not at a height which is comfortable for using the built-in keyboard.

One commercially available laptop computer, which is shown in FIG. 6 and described in more detail later, has a built-in keyboard, but also has a connector to which can be coupled a custom keypad. A keypad is essentially a portion of a conventional keyboard unit, and typically has only numeric keys and a few keys for special functions and/or cursor control. The custom keypad for this commercially available system has a cable with a plug which can be coupled to the connector on the laptop computer, the connector being intentionally different from that used for conventional keyboards in order to prevent a user from inadvertently plugging in a conventional keyboard unit which this conventional laptop computer is not designed to operate with. Thus, this conventional system solves some but not all of the problems associated with the keys of the typical laptop computer. Nevertheless, the majority of manual operator functions must still be carried out using the alphabetic keys of the built-in keyboard of the device, with the attendant problems discussed above. Further, the external keypad is coupled by the connector on the laptop computer directly to an internal keyboard processor of the laptop computer, and has to effect all communications with the main processor of the laptop computer through the internal keyboard processor.

It is an object of the invention to provide an improved circuit for facilitating use of a given computing device with two separate input sections which each have a plurality of keys, one of the input sections typically being an integral portion of the device and the other being a physically separate unit.

A further object is to provide such an arrangement in which the internal and external input section can include a full typewriter-type set of keys, and in which the external input unit can be either a keyboard having a full typewriter-type set of keys or a keypad having substantially less than a full typewriter-type set of keys, the keys of the keypad augmenting the keys of the internal input section.

A further object is to provide such an arrangement in which the external input section can be a conventional and commercially available keyboard unit.

The objects and purposes of the invention, including those set forth above, are met by providing a computing device which includes a processor, an internal input section which is an integral portion of the device and which includes a plurality of manually operable keys, a connector arrangement which can facilitate electrical connection to the device of an external input unit having a plurality of manually operable keys, a selectively actuable switch which can effect and interrupt an electrical connection between the connector arrangement and the processor, and an arrangement for selectively actuating and deactuating the switch.

BRIEF DESCRIPTION OF THE DRAWINGS

A preferred embodiment of the present invention is described hereinafter with reference to the accompanying drawings, in which.

DESCRIPTION OF THE PREFERRED EMBODIMENT

Figure 1:
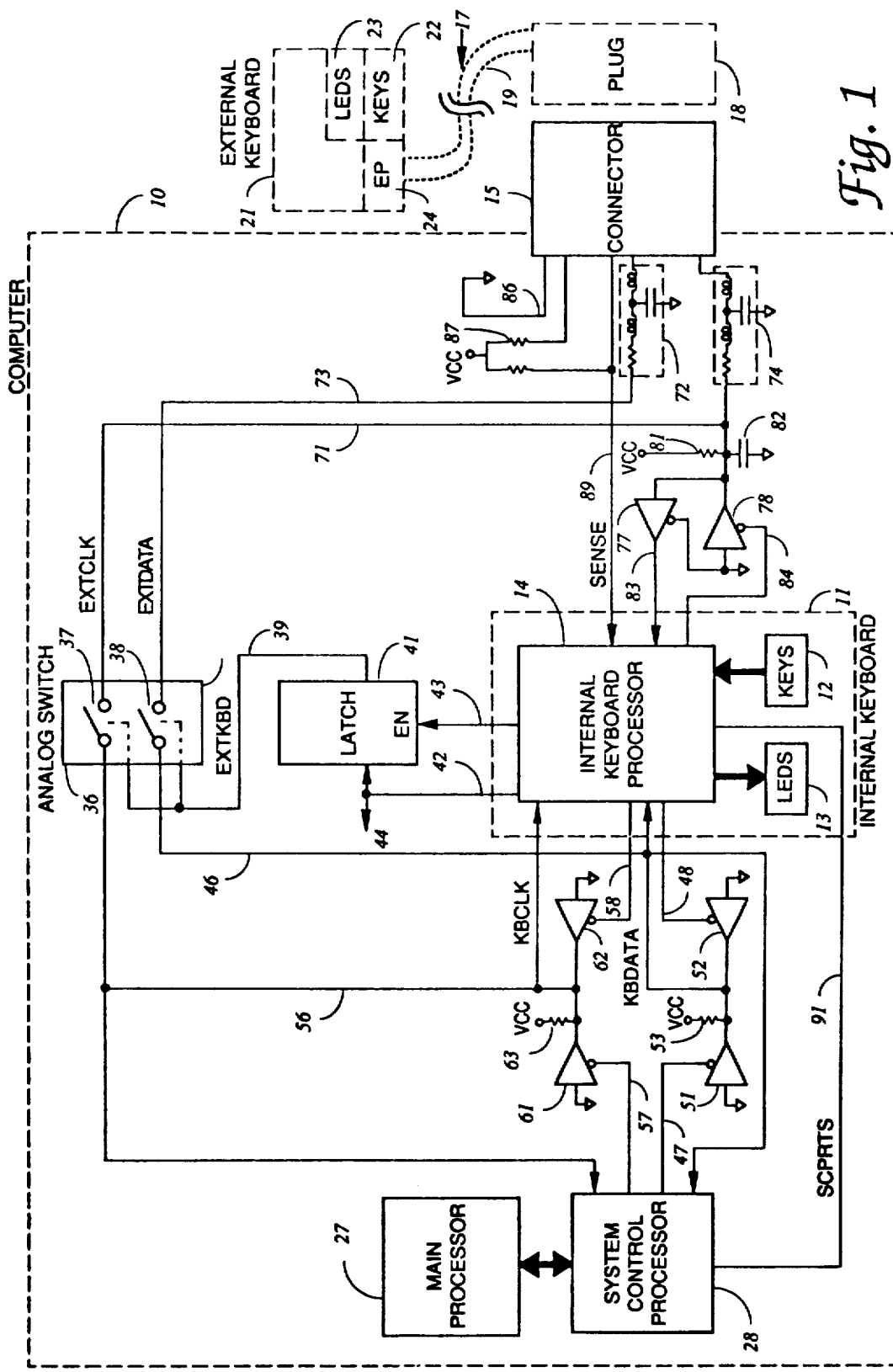
FIG. 1 is a diagrammatic view of a computing device embodying the present invention, and of an external keyboard unit which can be selectively coupled to the computing device.

Referring to FIG. 1, reference numeral 10 designates a portable computing device of the type commonly referred to as a "laptop" computer. The computer 10 has as an integral portion thereof an internal keyboard 11 which serves as an internal input section and includes a plurality of manually operable keys 12, a plurality of light emitting diodes (LEDs) 13, and internal keyboard processor 14 which detects manual operation of any of the keys 12 and which controls the illumination or non-illumination of each of the LEDs. The keys 12 include a standard typewriter-type set of keys, some of which can alternatively be used for special functions such as cursor control when a special further key is pressed.

The computer 10 also has a five-pin connector 15 which can be used to connect to the computer 10 an external unit 17 having a plug 18 which can be removably connected to the connector 15 and which is connected through a cable 19 to an external keyboard unit 21. The external unit 17 is preferably a conventional and commercially available unit having 101 or 102 keys, including a full set of typewriter-type keys as well as additional keys for special functions. The keyboard unit 21 has a plurality of manually operable keys 22, a plurality of LEDs 23, and an external processor 24 (EP) which detects manual operation of any one of the keys 22 and sends signals representative of the key to the computer 10 through cable 19, and which controls the illumination or non-illumination of each of the LEDs 23 in response to signals from the computer 10.

The computer 10 has a main processor 27 which carries out all of the primary computing functions, and includes a system control processor 28 which facilitates communications between the main processor 27 and the internal keyboard 11 or external unit 17, as described in more detail below.

The computer 10 includes an electronic analog switch 36 which has two switch contacts 37 and 38 controlled by a common control line 39 labeled EXTKBD. The control line 39 is the output of a latch 41, the input of the latch 41 being an output line 42 from the internal keyboard processor 14, and the latch control line 43 also being an output of the internal keyboard processor 14. The latch 41 is provided in the preferred embodiment because the output line 42 of the processor 14 is actually used for at least two different purposes within the computer as indicated diagrammatically at 44. Thus, a desired state for the control line 39 is output at 42 and latched into the latch 41 by the line 43, and the latch 41 will thereafter maintain the line 39 in the selected state while the output line 42 is used to carry out other functions. In situations where the output line 42 of the processor 14 can be dedicated exclusively to control of the switch 36, the latch 41 can be omited, and the output line 42 can be connected directly to the switch 36.

A bidirectional keyboard data line KBDATA is shown at 46 and is connected to the contact 38 of the switch 36, an input of the processor 14, an input of the processor 28, the outputs of two tri-state buffers 51 and 52, and to one end of a resistor 53 which has its other end connected to a constant d.c. voltage source Vcc. The processor 28 has an output line 47 which is connected to an enable input of the tri-state buffer 51, and the processor 14 has an output line 48 which is connected to an enable input of the tri-state buffer 52, the data input of the buffers 51 and 52 being connected to ground. The keyboard data line 46 is normally maintained at a logic high voltage by the resistor 53, but if either of the buffers 51 or 52 is enabled by the associated processor, the logic low voltage continuously present at its input causes the line 46 to be pulled down to a logic low voltage. Thus, for example, by using the line 47 to alternately enable and disable the buffer 51, the processor 28 can send a string of binary bits serially across the line 46.

In a similar manner, a bidirectional keyboard clock line KBCLK shown at 56 is connected to the switch contact 37, an input of the processor 14, an input of the processor 28, the outputs of two tri-state buffers 61 and 62, and to one end of a resistor 63 which has its other end connected to the constant voltage Vcc. The buffers 61 and 62 also have their data inputs grounded, and their enable inputs connected through respective lines 57 and 58 to the respective processors 28 and 14.

On the opposite side of the switch 36, the contact 38 is connected by a line 71 labeled EXTDATA through an R-L-C network 72 to one pin of the five-pin connector 15. Similarly, the contact 37 of switch 36 is connected by a line 73 through an R-L-C network 74 to another pin of the connector 15, and is also connected to the data input of a tri-state buffer 77 and the data output of a tri-state buffer 78, to one end of a pull-up resistor 81 which has its other end connected to the constant voltage Vcc, and to one end of a capacitor 82 which has its other end connected to ground. The R-L-C networks 72 and 74 filter out radio frequency interference signals (RFI). The enable input of the buffer 77 is connected to ground so as to always enable the buffer 77, and the data input of the buffer 78 is connected to ground. The output of the buffer 77 is connected through a line 83 to an interrupt input of the processor 14, and an output of the processor 14 is connected through a line 84 to the enable input of the buffer 78.

Two further pins of the connector 15 are respectively connected to ground at 86 and to one end of a resistor 87 which has its other end connected to the constant voltage Vcc, to thereby supply electrical power to any external unit 17 which happens to be connected to the connector 15. The remaining pin of the connector 15 is connected through a line 89 labeled SENSE to an interrupt input of the processor 14.

The system control processor 28 controls a request-to-send line 91 labeled SCPRTS, which is connected to an interrupt input of the processor 14.

As mentioned above, the external unit 17 is preferably one of many off-the-shelf commercially available keyboards, the connector 15 being of the type widely used in the computer industry in association with these keyboards. These commercially available keyboards utilize the four pins of connector 15 corresponding to the lines 71, 73, 86 and 87 in FIG. 1, but have no connection to the pin corresponding to the SENSE line labeled 89 in FIG. 1.

According to the invention, the external unit 17 can alternatively be a keypad, which is similar to a conventional keyboard, except that it has a substantially smaller number of keys, and has an output which is connected to the pin for SENSE line 89 and which is energized whenever a key is pressed in order to indicate that the unit 17 has data to send to the computer 10.

The system control processor 28 and the main processor 27 never really know whether information they receive is coming from the internal keyboard 11 or from the external unit 17. The task of supervising the keyboard 11 and external unit 17 so as to permit each to communicate with the processors 27 and 28 but without interference has been allocated to the internal keyboard processor 14, in a manner described in detail below with reference to FIGS. 2-5. In order to avoid confusion, the following discussion will first explain what happens when there is no external unit 17 connected to the computer 10, will then explain what happens when the external unit 17 which is a keyboard is connected, and will thereafter explain what happens when an external unit which is a keypad is connected.

Figure 2:
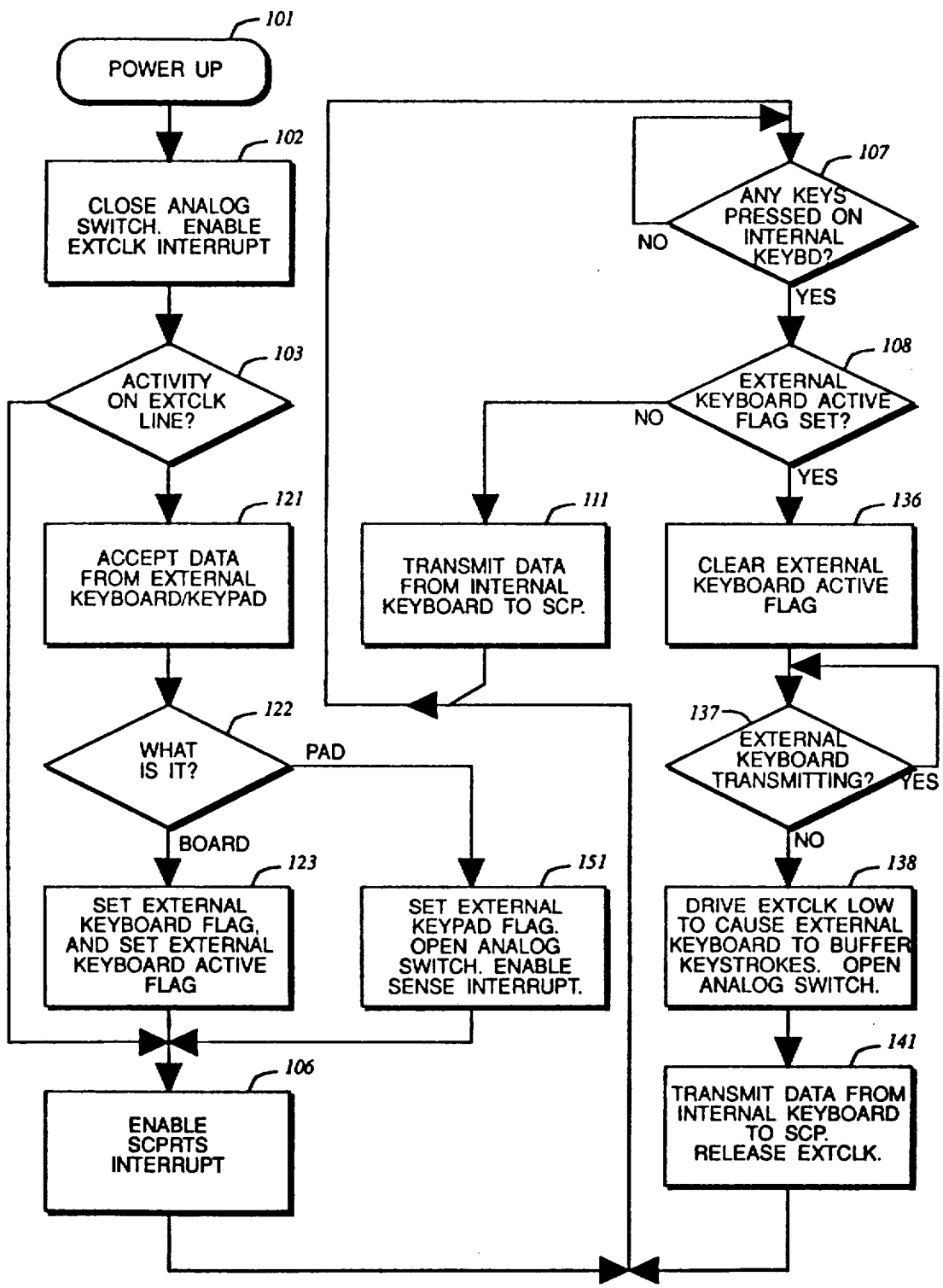
FIGS. 2-5 are flow charts showing respective portions of a control program executed by a processor which is a component of the computing device of FIG. 1.

FIGS. 2-5 are flow charts representing respective portions of the program executed by the processor 14. Referring to FIG. 2, following system power-up at block 101, control proceeds to block 102 where the processor 14 uses the output lines 42 and 43 to set the latch 41 so that line 39 closes both contacts 37 and 38 of the analog switch 36. Further, the processor 14 enables the interrupt input for line 83, which corresponds to the external clock line 71 labeled EXTCLK. Following power-up, any external unit 17 connected to the computer 10 will automatically attempt to send an identifying code to the computer 10. (This is inherent in conventional devices of this type). Consequently, at block 103, the processor 14 checks to see whether there is any interrupt on the EXTCLK line 73, which will be the case if an external unit 17 is connected to the computer 10. Assuming for the moment that no external unit 17 is connected, there will be no activity on the line 73, and the processor will thus proceed to block 106, where it will enable interrupts on the SCPRTS request-to-send line 91 from the processor 28. Then, at block 107, the processor 14 will check to see if any keys 12 of the internal keyboard 11 have been pressed. If none have been pressed, it will repeatedly execute the block 107 until one of the keys 12 is pressed. When a key 12 is pressed, the processor 14 proceeds to block 108, where it checks to see whether an external keyboard active flag has been set. As described later, the processor 14 sets this flag when it receives data from an external unit 17 due to one of the keys 22 having been pressed, and clears the flag when one of the keys 12 of the internal keyboard 11 is pressed. Thus, this particular flag essentially indicates whether the key most recently pressed was on the external unit 17 or internal keyboard 11. Since it is being assumed for the moment that there is no external unit 17, the flag will not be set and the processor will therefore proceed to step 111, where it will transmit data representing the particular one of the keys 12 which has been pressed to the system control processor 28 by sending the data through line 48, buffer 52, and line 51, and by sending a clock signal through line 58, buffer 52 and line 56 so that the processor 28 is notified of the incoming data and can accept it in a synchronized manner. Thereafter, the processor 14 returns to block 107, where it waits for another key 12 to be manually actuated.

Occasionally, the processors 27 and 28 will need to send data to the keyboard 11 or to the external unit 17, for example to change the state of illumination of one of the LEDs 13 or one of the LEDs 23. Internal processor 14 normally accepts this data for use by the internal keyboard 11, except when the last key pressed is on an external unit 17 which is a keyboard. If the external unit is a keypad, the data from the processor 28 is routed to the processor 14 rather than to the external keypad.

Figure 3:
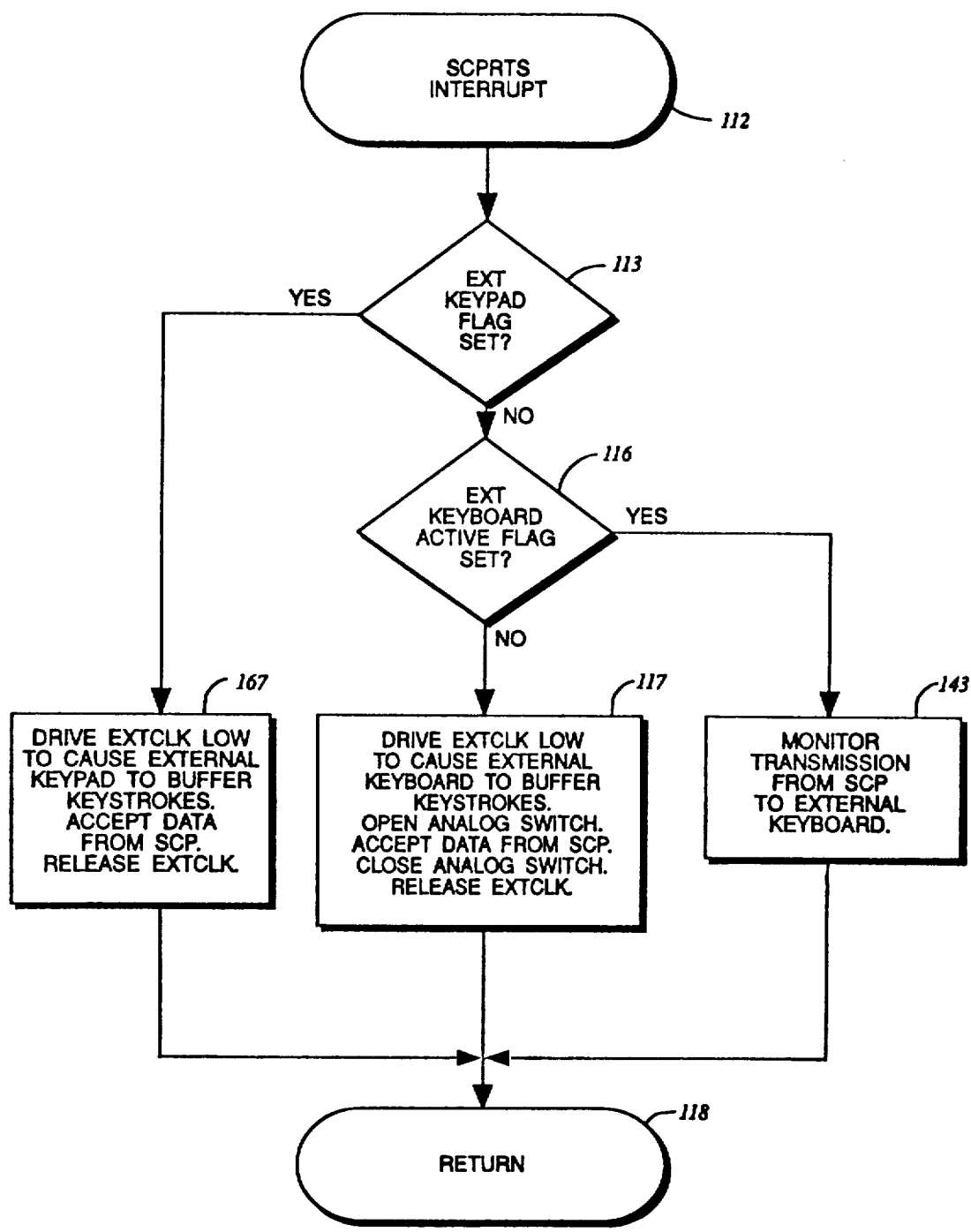

In particular, when the processor 28 wishes to send such data, it sends a signal on the request line SCPRTS, which interrupts the processor 14 and causes it to execute the interrupt routine shown in FIG. 3. In particular, the routine is entered at block 112, and at block 113 the processor checks to see whether it has previously set a keypad flag in order to indicate that an external unit is present and is a keypad. Still assuming there is no external unit, the processor will proceed to block 116 and check to see whether the keyboard active flag is set and thus indicates that there is an external unit 17 which is a keyboard and that the last key pressed was on the external unit 17. Still assuming there is no external unit, the processor will proceed to block 117, where it uses line 84 to drive the EXTCLK line 73 to a logic low voltage. If there were an external unit, this would cause it to temporarily buffer keystrokes as a result of the inherent design of such conventional units. Then, still in block 117, the processor 14 opens contacts 37 and 38 of the analog switch in order to disconnect any external keyboard which may be present from the data and clock lines 46 and 56 so that it is impossible for the external unit to receive the transmission which the processor 28 is about to output. The processor 28 then carries out its output operation using the lines 47 and 57, and the processor 14 accepts the information and uses it in an appropriate manner, for example to control the LEDs 13. Then, the processor 14 closes the contacts 37 and 38 of the analog switch 36, and releases the EXTCLK line 73 in order to permit an external keyboard 17 (if any) to transmit any keystrokes that it may have buffered. Then, at 118, the processor 14 returns to the point at which it was interrupted, which will be in the loop containing blocks 107, 108 and 111 in FIG. 2.

Turning now to the situation where an external keyboard unit 17 is connected to the connector 15, the processor 14 will proceed following power-up in block 101 of FIG. 2 through block 102 to block 103, where it will find that there is activity on the EXTCLK line 73 because the external keyboard 17 is automatically outputting an identifying code. Therefore, the processor will proceed to block 121 where it accepts this code, and will then proceed to block 122 where it checks the code in order to see whether it is identifying a keyboard or keypad. Here, it will identify a keyboard, and the processor 14 will proceed to block 123, where it will set the external keyboard flag in order to indicate that an external keyboard is present, and will set the external keyboard active flag in order to indicate that the external keyboard will be treated as the active or primary keyboard until such time as one of the keys 12 of the internal keyboard 11 is pressed. The processor 14 will then proceed to block 106 and then block 107, where it repeatedly checks to see if any of the keys 12 of the internal keyboard 11 have been pressed. If one of the keys 22 of the external keyboard 21 is pressed at this time, the external keyboard 21 will make an appropriate transmission through the connector 15 to the lines 71 and 73, as a result of which the line 73 will, through buffer 77 and line 83, interrupt the processor 14 and cause it to execute the routine shown in FIG. 4.

Figure 4:
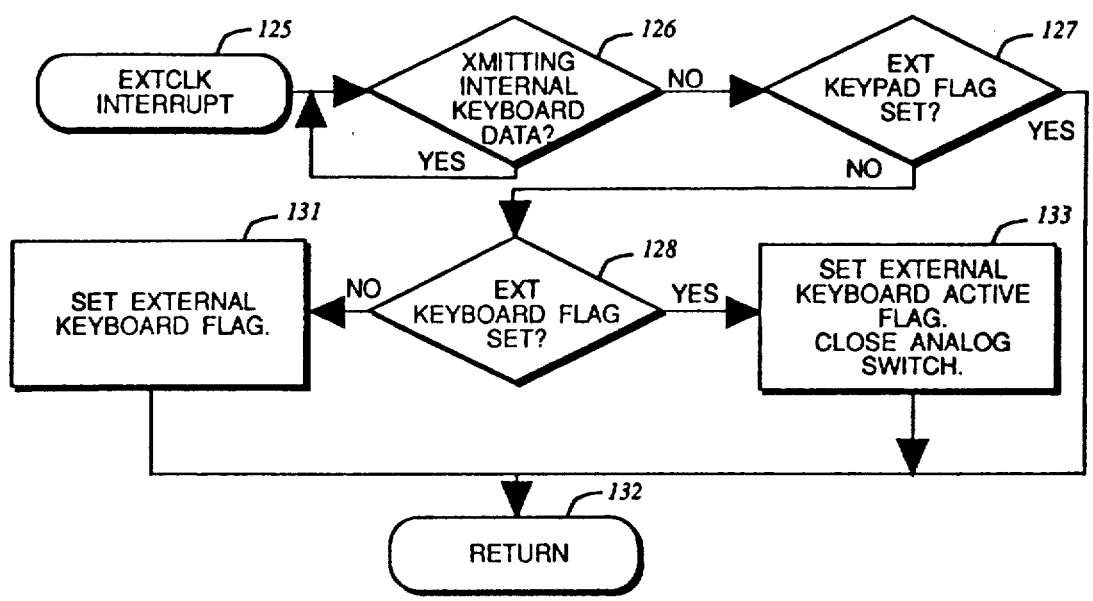

More specifically, referring to FIG. 4, processing begins at block 125, and at block 126 the processor waits for any transmission it may be making to the processor 28 to reach completion. Then, at block 127 the processor 14 checks to see if the external keypad flag is set to indicate that there is an external unit which is a keypad. Here, since the external unit is assumed to be a keyboard rather than keypad, the processor proceeds to block 128 and checks to see if the external keyboard flag is set to indicate there is an external keyboard. If the external keyboard flag is not set at this point, that means that the external unit 17 was not present when the computer 10 was powered up and has just been plugged in, and the processor 14 will proceed to block 131 where it sets the external keyboard flag, and will then return at block 132 to the point at which it was interrupted in the routine of FIG. 2. On the other hand, the usual situation at block 128 is a determination that the external keyboard flag is already set, and the processor 14 will thus proceed to block 133 where it sets the external keyboard active flag (regardless of whether this flag was already set) in order to indicate that the most recently pressed key is on the external keyboard 21, and then closes the contacts of the analog switch 36 (regardless of whether they were open or closed) in order to ensure that the connector 15 is connected through the switch 36 to the processor 28 and can thus transmit data representative of the activated key to the processor 28. The processor 14 then proceeds to block 132 where it returns to the location at which it was interrupted in the routine of FIG. 2.

In the routine of FIG. 2, if it is determined at block 107 that one of the keys 12 of the internal keyboard 11 has been pressed, the processor proceeds to block 108, where it checks to see whether the external keyboard active flag is set. If it is not set, then the analog switch 36 is already open, and the processor 14 proceeds to block 111 where it transmits to the processor 28 data representative of the activated key 12, after which it returns to block 107. On the other hand, if the processor finds at block 108 that the external keyboard active flag is set, which means that the analog switch 36 is presently closed, it proceeds to block 136 where it clears the external keyboard active flag in order to reflect the fact that the most recently activated key is one of the keys 12 of the internal keyboard 11, and then proceeds to block 137 where it waits for any transmission currently in progress from the keyboard 21 to the processor 28 to be completed. Following completion of any such transmission, the processor 14 proceeds to block 138, where it drives the EXTCLK line 73 to a logic low voltage in order to cause the external keyboard 21 to buffer keystrokes, and then opens both contacts of the analog switch. Then, at block 141, it transmits the data representative of the activated key 12 to the processor 28, and then releases the EXTCLK line 73 so that the external keyboard 21 can again transmit to the computer 10.

When the processor 28 uses the SCPRTS line 91 to interrupt the processor 14 and indicate that the processor 28 has data to send to a keyboard, control is transferred to the routine of FIG. 3 and proceeds through blocks 112 and 113 as previously described to block 116. In block 116, the processor checks to see if the external keyboard active flag is set, or in other words whether the external keyboard 21 is considered the active keyboard because the most recent key pressed is on that keyboard. If the most recent key pressed was one of the keys 12 of the internal keyboard rather than one of the keys 22 of the external keyboard 21, the processor 14 will proceed to block 117 and carry out the functions previously described. On the other hand, if the processor 14 finds at block 116 that the external keyboard active flag is set, it will proceed to block 143 and merely monitor the transmission of data from the processor 28 through the switch 36 to the keyboard 21, the keyboard 21 accepting the data and using it to control the LEDs 23. Thereafter, the processor 14 returns at 118 to the point at which it was interrupted in the routine of FIG. 2.

Turning now to the situation in which an external unit 17 is present but is a keypad, the processor 14 will proceed following power-up at block 101 in FIG. 2 through 102 to block 103, where it will find that the EXTCLK line 73 is active because the external keypad is transmitting an identifying code to the computer 10. Then it will proceed to block 121 and then block 122, where it will check to see whether the code indicates that the external unit is a keyboard or a keypad. It will find that the unit is a keypad, and will proceed to block 151, where it sets the external keypad flag in order to indicate that there is an external unit and that it is a keypad. It will also open the contacts of analog switch 36, and enable the interrupt on SENSE line 89. Then it will proceed to block 106 and to block 107, where it will wait for a key on the internal keyboard 11 to be pressed. When one of the keys 12 on the internal keyboard is pressed, it will proceed to block 108, where it will necessarily find that the external keyboard active flag is not set (because the external unit is a keypad rather than a keyboard), and it will then proceed to block 111 where it will transmit to the processor 28 data representing the actuated key 12. Then, it will return to block 107 to wait for another key 12 to be pressed.

Figure 5:
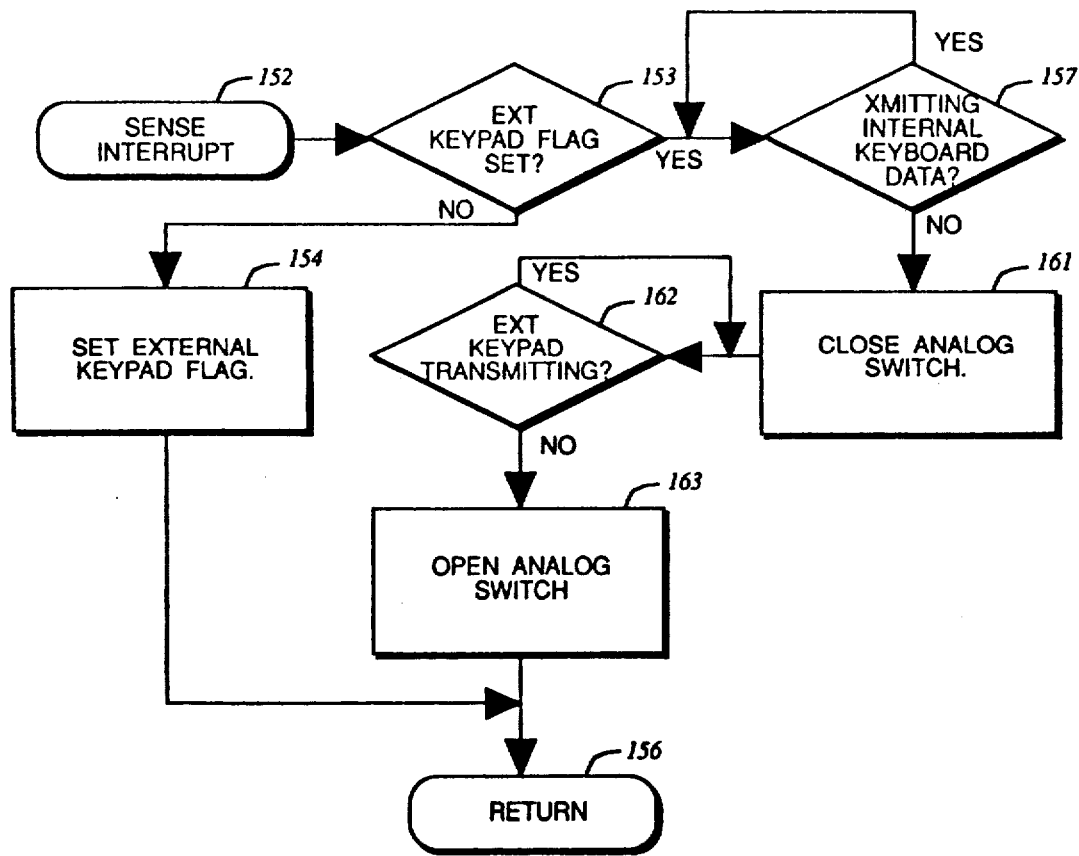

When one of the keys 22 of the keypad 21 is pressed, the keypad 21 produces a signal on the SENSE line 89 which interrupts the processor 14 and causes it execute the routine shown in FIG. 5. This routine is entered at block 152 in FIG. 5, and proceeds to block 153 where the processor 14 checks to see whether the external keypad flag has already been set. If it is not, then the keypad was not present at power-up and has just been plugged in, and the processor 14 proceeds to block 154 where it sets the keypad flag, and then exits the routine at block 156. Typically, however, the processor 14 will find at block 153 that the external keypad flag is set, and will proceed to block 157 where it waits for completion of any transmission it is already making to the processor 28. Then, at block 161 it closes the analog switch 36, and then waits at 162 while the external keypad transmits to the processor 28 data representing the actuated key 22. Then, the processor 14 opens the analog switch 36 at block 163, and then returns at block 156 to the program from which it was interrupted. The activity which has occurred on the EXTCLK line 73 during the transmission will immediately produce another EXTCLK interrupt, which is handled by the routine of FIG. 4. This routine is entered at 125 and at block 127 the processor checks to see if the external keypad flag is set, and since in this situation it is, the processor 14 knows that the necessary data transmission has already taken place, and thus returns through block 132 without doing anything further.

In the event the processor 28 uses the SCPRTS line 91 to indicate that it wishes to transmit data to the keyboard 11, the routine of FIG. 3 is entered as previously mentioned, and control proceeds from block 112 to block 113 where it will be found that the external keypad flag is set. This tells the processor 14 that there is an external keypad present, and the processor 14 thus knows that it will accept the data from the processor 28 because such data is routed to an external unit only if the external unit is a keyboard rather than a keypad. Thus, control proceeds to block 167, where the processor 14 drives the EXTCLK line 73 low in order to cause the external keypad to buffer keystrokes, accepts the data from the processor 28, and then releases the EXTCLK line to enable the external keypad to again transmit data to the computer 10.

In the preferred embodiment, the system control processor 28 is implemented with an Intel 8042 microprocessor and the internal keyboard processor 14 is implemented with a Hitachi HD6305V0 microprocessor, but it will be recognized that almost any conventional and commercially available microprocessor could be utilized to implement either of these processors. The buffers 51, 52, 61, 62, 77 and 78 are implemented in the preferred embodiment with conventional and commercially available 74LS125 circuits and the electronic analog switch 36 is implemented with a conventional and commercially available Harris HI201 component.

Figure 6:
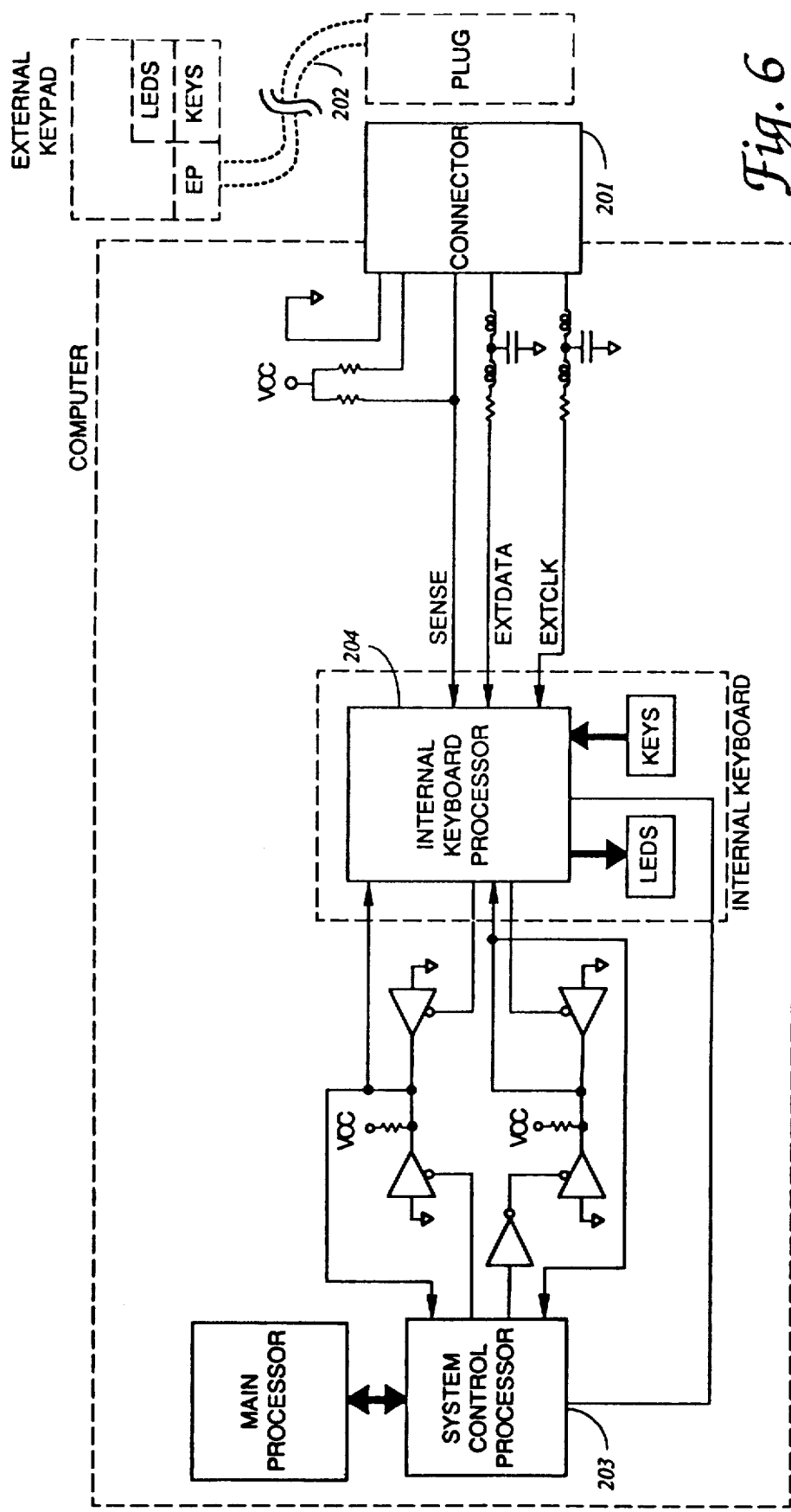
FIG. 6 is a diagrammatic view showing a prior art system.

FIG. 6 depicts a prior art arrangement which is similar in some respects to the inventive arrangement of FIG. 1, but there are some important differences. In particular, the connector 201 is a non-standard connector incompatible with conventional keyboards, and the external unit 201 must be a keypad and can never be a keyboard. There is no electronic switch which is comparable to the switch 36 of FIG. 1 and can effect a direct connection between the connector 201 and the system control processor 203. Consequently, all communications between the processor 203 and keypad 202 must pass through the internal keyboard processor 204. There is no request-to-send line from processor 203 to processor 204 which would correspond to the line 91 in FIG. 1, and there is no circuitry corresponding to buffer 78 of FIG. 1 which would permit the processor 204 to exercise any control over the clock line EXTCLK. The EXTCLK line is only an input from connector 201 and is never used to output any signal in FIG. 6.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A computing device, comprising: a processor having an input; an internal input section which is an integral portion of said device and which includes a plurality of first keys and means responsive to manual actuation of one of said first keys for automatically generating a first signal identifying the actuated first key; connector means for facilitating selective electrical connection to said device of an external input unit having a plurality of second keys and means responsive to manual actuation of one of said second keys for automatically generating a second signal identifying the actuated second key; a selectively actuable switch which can effect and interrupt an electrical connection between a terminal of said connector means carrying said second signal and said input of said processor; and control means responsive to generation of each said first signal and each said second signal for supplying each said first signal and each said second signal to said input of said processor, said control means actuating and deactuating said switch when said control means is respectively supplying said second signal and said first signal to said input, wherein said external input section generates with each said second signal a clock signal which is supplied to a further terminal of said connector means, wherein said switch includes first and second contacts which are commonly controlled, and including a first data line portion coupling one side of said first contact to said first-mentioned terminal of said connector means, a second data line portion coupling the other side of said first contact to said input of said processor, a first clock line portion coupling one side of said second contact to said further terminal of said connector means carrying said clock signal, and a second clock line portion connecting the other side of said second contact to a further input of said processor; wherein said control means for selectively controlling said switch includes a further processor coupled to said first keys of said internal input section, includes a first tri-state buffer having a data input connected to said first clock line portion, an enable input connected to ground, and a data output connected to an input of said further processor, includes a second tri-state buffer having a data input connected to ground, an enable input connected to an output of said further processor, and a data output connected to said first clock line portion, and includes a resistor having one end connected to said first clock line portion and its other end connected to a source of power.

2. A device of claim 1, wherein said second data line portion is connected to an input of said further processor; wherein said second clock line portion is connected to an input of said further processor; including third and fourth tri-state buffers which each have an enable input, a data input connected to ground, and a data output connected to said second data line portion, said first-mentioned and further processors each having an output connected to the enable input of a respective one of said third and fourth buffers; including fifth and sixth tri-state buffers which each have an enable input, a data input connected to ground, and a data output connected to said second clock line portion, said first-mentioned and further processors each having a data output connected to the enable input of a respective one of said fifth and sixth buffers; including a resistor having one end connected to said second data line portion and its other end connected to a source of power; and including a resistor having one end connected to said second clock line portion and its other end connected to a source of power.

3. A device of claim 2, wherein said control means includes a latch having a data input coupled to an output of said further processor, an enable input coupled to an output of said further processor, and a data output coupled to a control input of said selectively actuable switch.

4. A device of claim 3, including means for coupling said connector means to a source of power and to ground, and including means for filtering radio frequency signals from said first data line portion and said first clock line portion.

5. A device of claim 4, wherein said first-mentioned processor has a request output which is connected to an input of said further processor, and including a sense line from said connector means which is coupled to an input of said further processor and to one end of a resistor which has its other end connected to a source of power.

6. A device of claim 5, wherein said inputs of said further processor, to which are respectively connected said request output of said first-mentioned processor, said data output of said first buffer and said sense line from said connector means, are each an interrupt input.

7. A computing device, comprising: a processor having an input; an internal input section which is an integral portion of said device and which includes a plurality of first keys and means responsive to manual actuation of one of said first keys for automatically generating a first signal identifying the actuated first key; connector means for facilitating selective electrical connection to said device of an external input unit having a plurality of second keys and means responsive to manual actuation of one of said second keys for automatically generating a second signal identifying the actuated second key; a selectively actuable switch which can effect and interrupt an electrical connection between a terminal of said connector means carrying said second signal and said input of said processor; and control means responsive to generation of each said first signal and each said second signal for supplying each said first signal and each said second signal to said input of said processor, said control means actuating and deactuating said switch when said control means is respectively supplying said second signal and said first signal to said input; and wherein said control means for selectively actuating and deactuating said switch includes a further processor which is operatively coupled to said first keys of said internal input section, and wherein said first-mentioned processor has a request output which is connected to an interrupt input of said further processor.

8. A device of claim 7, wherein said external input unit generates with each said second signal a clock signal which is supplied to a further terminal of said connector means, wherein said switch includes first and second contacts which are commonly controlled, and including a first data line portion connecting one side of said first contact to said first-mentioned terminal of said connector means, a second data line portion connecting an opposite side of said first contact to said input of said first-mentioned processor, a first clock line portion connecting one side of said second contact to said further terminal of said connector means carrying said clock signal, and a second clock line portion connecting an opposite side of said first contact to a further input of said first-mentioned processor, said further processor being operatively coupled to said first clock line portion, said second clock line portion and said second data line portion, said further processor including means responsive to signals on said first clock line portion for closing said first and second contacts of said switch to facilitate connection between said first and second data line portions and between said first and second clock line portions, and said further processor including means responsive to actuation of one of said first keys of said internal input section for opening said first and second contacts of said switch.

9. A device of claim 8, wherein said further processor has means for selectively forcing said first clock line portion to a logic low voltage.

10. A device of claim 9, wherein said further processor has means responsive to a signal on said request line from first-mentioned processor for routing a data transmission from said first-mentioned processor to one of itself and, through said switch, said connector means.

11. A device of claim 7, wherein said connector means has a sense output which is connected to an input of said further processor, said further processor having means responsive to a signal on said sense output of said connector means for closing said switch to facilitate a data transmission therethrough and for subsequently opening said switch following such data transmission.

12. A computing device, comprising: a processor having an input; an internal input section which is an integral portion of said device and which includes a plurality of first keys and means responsive to manual actuation of one of said first keys for automatically generating a first signal identifying the actuated first key; connector means for facilitating selective electrical connection to said device of an external input unit having a plurality of second keys and means responsive to manual actuation of one of said second keys for automatically generating a second signal identifying the actuated second key; a selectively actuable switch which when respectively actuated and deactuated respectively effects and interrupts an electrical connection between a terminal of said connector means carrying said second signal and said input of said processor; and control means responsive to generation of each said first signal and each said second signal for supplying each said first signal and each said second signal to said input of said processor, said control means actuating and deactuating said switch when said control means is respectively supplying said second signal and said first signal to said input; wherein said control means includes means responsive to generation of one of said first signals at a point in time when one of said second signals is being supplied to said data input of said processor for delaying supplying of such first signal until after supplying of the second signal is completed, and means responsive to generation of one of said second signals at a point in time when one of said first signals is being supplied to said data input of said processor for delaying supplying of such second signal until after supplying of the first signal is completed.

13. A device of claim 12, wherein said external input section generates with each said second signal a clock signal which is supplied to a further terminal of said connector means, wherein said switch includes first and second contacts which are commonly controlled, and including a first data line portion coupling one side of said first contact to said first-mentioned terminal of said connector means, a second data line portion coupling the other side of said first contact to said input of said processor, a first clock line portion coupling one side of said second contact to said further terminal of said connector means carrying said clock signal, and a second clock line portion connecting the other side of said second contact to a further input of said processor.

14. A device of claim 12, wherein each of said second keys is functionally equivalent to a respective one of said first keys.

15. A computing device, comprising: a processor having an input; an internal input section which is an integral portion of said device and which includes a plurality of first keys and means responsive to manual actuation of one of said first keys for automatically generating a first signal identifying the actuated first key; connector means for facilitating selective electrical connection to said device of an external input unit having a plurality of second keys and means responsive to manual actuation of one of said second keys for automatically generating a second signal identifying the actuated second key; a selectively actuable switch which when respectively actuated and deactuated respectively effects and interrupts an electrical connection between a terminal of said connector means carrying said second signal and said input of said processor; and control means responsive to generation of each said first signal and each said second signal for supplying each said first signal and each said second signal to said input of said processor, said control means actuating and deactuating said switch when said control means is respectively supplying said second signal and said first signal to said input; wherein said processor has means for generating an output signal, and wherein said control means includes means for identifying a selected one of said external input unit and said internal input section which most recently generated one of said first and second signals, and includes means for supplying each said output signal from said processor to said selected one of said external input unit and internal input section.

16. A device of claim 15, wherein said processor has an output which carries said output signals therefrom, and including means for applying said output signals from said processor to a line connecting said switch to said input of said processor, and wherein said control means respectively actuates and deactuates said switch when said selected one of said external input unit and said internal input section is respectively said external input unit and said internal input section.

17. A method of facilitating communication between an external input unit which has a plurality of first keys and a computing arrangement having a processor, having an internal input section which has a plurality of second keys, having a connector which releasably electrically connects said external input unit to said computing arrangement, and having a switch which can effect and interrupt an electrical connection between the connector and a data input of the processor, comprising the steps of: automatically generating a first signal in response to manual actuation of one of said first keys; automatically generating a second signal in response to manual actuation of one of said second keys; and supplying each said first and second signal to said data input of said processor, said supplying step including the steps of detecting the occurrence of each of said first and second signals, automatically actuating said switch in response to detection of said first signal and while said first signal is supplied to said data input and automatically deactuating said switch in response to detection of said second signal and while said second signal is supplied to said data input.

18. A computing device, comprising: a processor having an input; an internal input section which is an integral portion of said device and which includes a plurality of first keys and means responsive to manual actuation of one of said first keys for automatically generating a first signal identifying the actuated first key; connector means for facilitating selective electrical connection to said device of an external input unit having a plurality of second keys and means responsive to manual actuation of one of said second keys for automatically generating a second signal identifying the actuated second key; and control circuit means responsive to generation of each said first signal and each said second signal for supplying each said first signal and each said second signal to said input of said processor, said control circuit means including a selectively actuable switch which can effect and interrupt an electrical connection between a terminal of said connector means carrying said second signal and said input of said processor; and said control circuit means having means for detecting the occurrence of said first and second signals, means for automatically actuating said switch in response to detection of said first signal and while said control circuit means is supplying said first signal to said input, and having means for automatically deactuating said switch in response to detection of said second signal and while said control circuit means is supplying said second signal to said input.

19. A method of claim 17, wherein said detecting step includes the step of setting a flag to a first logical condition in response to detection of said first signal and setting said flag to a second logical condition in response to detection of said second signal, and including the steps of keeping said switch actuated while said flag has said first logical condition and keeping said switch deactuated while said flag has said second logical condition.

20. A method of claim 19, including in response to detection of said first signal when said flag has said second logical condition the steps of checking for a transmission in progress of one of said second signals to said data input and waiting for the completion of any detected transmission, and thereafter carrying out said step of actuating said switch, and including in response to detection of said second signal when said flag has said first logical condition the steps of checking for a transmission in progress of one of said first signals to said data input and waiting for the completion of any detected transmission, and thereafter carrying out said step of deactuating said switch.

21. A method of claim 20, wherein said first signal includes separate data and clock signals, including subsequent to said step of waiting for completion of a detected transmission of one of said second signals the step of forcing said clock signal to a predetermined logical condition, and including subsequent to said step of deactuating said switch the step of releasing said clock signal from said predetermined logical condition.

22. A method of claim 17, wherein said first signal includes a data signal, a clock signal and a sense signal, said step of detecting the occurrence of said first signal being carried out by detecting a change in the state of said sense signal.

23. A method of claim 22, including the step of maintaining said switch in an actuated condition in response to the absence of actuation of said sense signal.

* * * * *